United States Patent [19]
Young

[11] 3,765,375
[45] Oct. 16, 1973

[54] ANIMAL CARRYING DEVICE FOR MOTORCYCLES

[76] Inventor: Larry L. Young, 2707 S. 72nd Dr., Kansas City, Kans. 66106

[22] Filed: Dec. 6, 1971

[21] Appl. No.: 204,876

[52] U.S. Cl................. 119/96, 224/30 R, 280/202
[51] Int. Cl............................................. A62b 35/00
[58] Field of Search................. 224/30 R, 39 R, 6, 224/5 BC, 42.4 SR, 42.4 SB, 42.42 A, 40, 42.4; 119/96; 280/290, 202; 296/24 C; 297/384, 385, 386, 389

[56] References Cited
UNITED STATES PATENTS

| 1,081,326 | 12/1913 | Parker | 224/31 |
| 1,326,716 | 12/1919 | Dunning | 297/389 X |
| 3,310,034 | 3/1967 | Dishart | 297/385 X |

FOREIGN PATENTS OR APPLICATIONS

| 812,035 | 8/1951 | Germany | 224/30 R |
| 878,904 | 6/1953 | Germany | 224/30 R |
| 879,302 | 2/1943 | France | 280/290 |

Primary Examiner—Gerald M. Forlenza
Assistant Examiner—Jerold M. Forsberg
Attorney—Claude A. Fishburn et al.

[57] ABSTRACT

An animal carrying device for motorcycles including a frame removably mounted on a gasoline tank of a motorcycle and an animal harness resiliently connected to the frame in a position above the gasoline tank of the motorcycle to support pets or small children thereon and to restrain movement of pets or small children relative to the motorcycle. The frame includes spaced end members removably secured to respective opposite end portions of the gasoline tank and spaced adjustable side members extending between the end members to conform to the size of the motorcycle.

4 Claims, 5 Drawing Figures

PATENTED OCT 16 1973 3,765,375
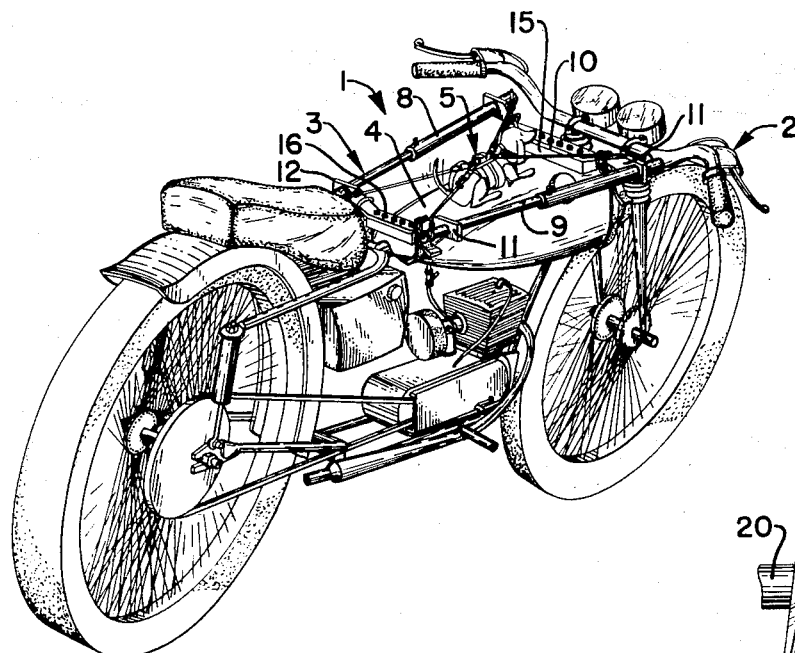
Fig.1.
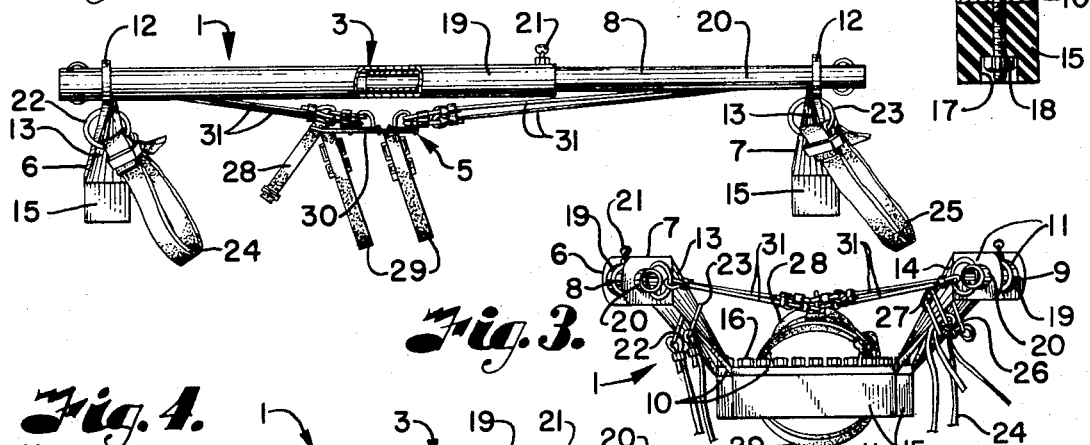
Fig.2.
Fig.5.
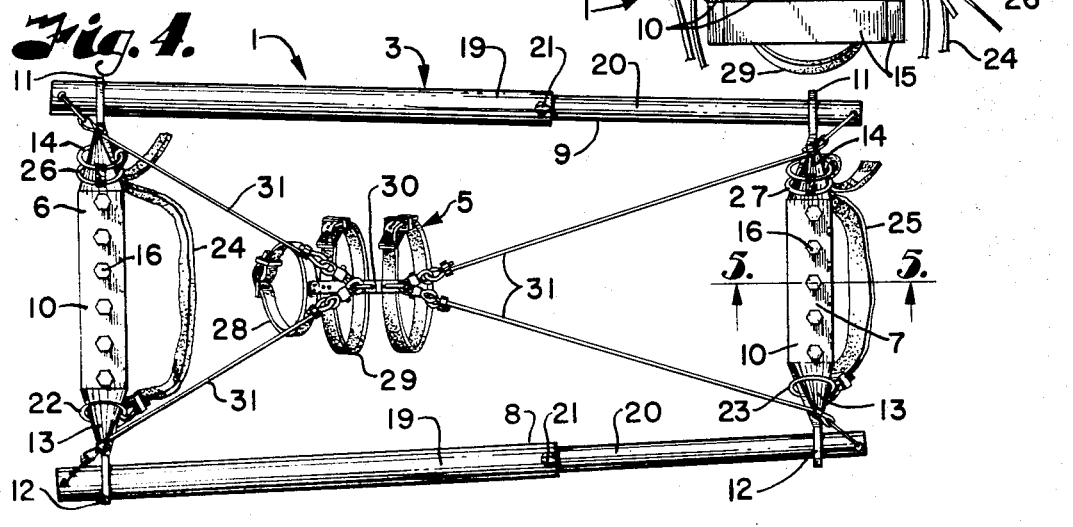
Fig.3.
Fig.4.

ANIMAL CARRYING DEVICE FOR MOTORCYCLES

The present invention relates to animal carrying devices and, more particularly, to a carrying device for use with motorcycles to protect and restrain pets or small children while riding on a motorcycle.

Difficulty has been experienced in restraining pets and small children while riding on a motorcycle to protect same from injury due to the natural inclination of pets or small children to move back and forth and to distract the attention of the motorcycle driver from driving and possibly falling off the motorcycle.

The principle objects of the present invention are: to provide a practical and simple carrying device for pets or small children which is easily installed on a motorcycle to protect and restrain pets or small children from falling or being thrown off the motorcycle upon a sudden stop of the vehicle, and from moving around on the motorcycle; to provide such a carrying device for motorcycles having an object securing means which is comfortable for pets or small children to wear, rapidly and easily fitted to the body of the pet or small child, and which will safely withstand a sudden stress many times greater than the stress resulting from sudden stops and the like; and to provide such a carrying device which is economical to manufacture, durable in construction, adjustable to conform to the respective motorcycle, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the carrying device for motorcycles of the present invention.

FIG. 1 is a perspective view of a motorcycle having mounted thereon a carrying device illustrating features of the present invention.

FIG. 2 is an enlarged side elevational view of the carrying device.

FIG. 3 is an enlarged end elevational view of the carrying device.

FIG. 4 is an enlarged top plan view of the carrying device.

FIG. 5 is a further enlarged fragmentary transverse sectional view through an end member of a frame for the carrying device and taken on line 5—5, FIG. 4.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

Reference numeral 1 generally designates an animal carrying device for use with a motorcycle 2 for carrying pets or small children and for restraining movements by the pets or small children while riding on the motorcycle 2. The animal carrying device 1 includes a frame 3 removably mounted on a gasoline tank 4 of the motorcycle 2 and an object securing harness 5 resiliently connected to the frame 3 in a position above the gasoline tank 4 of the motorcycle 2 to support pets or small children thereon and to restrain movement of the pets or small children relative to the motorcycle 2.

The illustrated frame 3 is adapted to conform to the size of the motorcycle 2 and includes spaced front and rear ends 6 and 7 respectively removably secured to respective opposite end portions of the gasoline tank 4 and laterally spaced adjustable side members 8 and 9 extending between end portions of the ends 6 and 7 whereby the frame 3 is adjustable to conform to the size of the motorcycle 2.

The ends 6 and 7 of the frame 3 may be any desired shape, such as pipe, angles, plates, or the like, however, in the illustrated structure, the front and rear ends 6 and 7 are shown as bars and each have a center portion 10 and opposed end portions 11 and 12. When the ends 6 and 7 are installed on the gasoline tank 4 of the motorcycle 2, the center portions 10 thereof are generally horizontal and the end portions 11 and 12 are generally vertical with transition portions 13 and 14 extending between respective opposite ends of the center portion 10 and the end portions 11 and 12, respectively.

It is desirable that the frame 3 be removably secured to the gasoline tank 4 in a manner which will not mar or damage the paint or finish thereof, therefore, the center portion 10 of each of the ends 6 and 7 has a protective member 15 suitably mounted thereon for engagement with an upper surface of the gasoline tank 4. The protective member 15 is preferably a suitable resilient non-abrasive material, such as rubber, neoprene or the like, and is suitably secured to the center portion 10 of the respective ends 6 and 7, as by being bonded thereto or by a plurality of bolts 16 each extending through the respective center portion 10 and through the protective member 15 and into a recess 17 in a lower surface of the protective member 15 to receive a suitable nut 18 therein.

It is desirable that the frame 3 be adjustable longitudinally to vary the spacing between the ends 6 and 7 to conform to the size of the respective gasoline tank 4. Therefore, the side members 8 and 9 are each adjustable in length and the side members 8 and 9 each have a first portion 19 secured to one of the ends and a second portion 20 secured to the other end of the frame 3 with the second portion 20 being movable longitudinally of the first portion 19.

In the illustrated structure, the first portions 19 of the side members 8 and 9 are each suitably secured to respective end portions 11 and 12 of the front end 6, as by welding, and the second portion 20 of the side members 8 and 9 are each suitably secured to respective end portions 11 and 12 of the rear end 7 as by welding. The first and second portions 19 and 20 are illustrated as tubular members with the second portion 20 being telescopically received within the first portion 19. It is desirable to maintain the adjusted length of the side members 8 and 9, therefore, suitable fastening devices, such as set screws 21, are mounted in the free end portion of the first portion 19 and are engageable with the second portion 20 received therein.

The protective members 15 and the front and rear ends 6 and 7 are removably secured to respective end portions of the gasoline tank 4 by end rings 22 and 23 movably mounted on one of the transition portions 13 and rear ends 6 and 7. Straps 24 and 25 each have one end thereof secured to the end rings 22 and 23 respectively and keeper members 26 and 27 are movably mounted on the other transition portion 14 of the front and rear ends 6 and 7 respectively. The keeper members 26 and 27 are adapted to receive the other or free end of the straps 24 and 25 respectively therein to secure same in the keeper members 26 and 27. The straps 24 and 25 each extend around a portion of the gasoline tank 4 substantially aligned with the portion in engagement with the protective member 15 on the respective ends 6 and 7 to thereby removably secure the frame 3 to the gasoline tank 4. The keeper members 26 and 27 are illustrated as a pair of rings preferably suitably secured together, as by a suitable strap extending therebetween.

The carrying device 1 is adapted for restraining pets or small children depending upon the construction of the object securing harness 5. In the illustrated structure, the object securing harness 5 is illustrated as being particularly adapted for securing pets, particularly dogs, and includes a collar or neck-portion 28 and spaced body portions 29. The collar or neck-portion 28 and the body portions 29 are suitably connected together, as by an elongated connection member 30. A limited amount of movement of the pet is desirable, therefore, a plurality of resilient members 31, such as springs, rubber cords, or the like, extend between respective opposite ends of the connection member 30 and opposite end portions of the frame 3.

Assembling a carrying device for animals or small children constructed as illustrated and describes is extremely fast and simple. The frame 3 is positioned on the gasoline tank 4 of the motorcycle 2 and the ends 6 and 7 are positioned adjacent the respective front and rear portions of the gasoline tank 4 with the respective protective members 15 thereon engaging the upper surface of the tank 4. The side members 8 and 9 of the frame 3 are adjusted, as desired, and the set screws 21 are adjusted to secure the side members 8 and 9 in the adjusted length. The straps 24 and 25 are secured in the keeper members 26 and 27 respectively thereby securing the carrying device 1 in position on the gasoline tank 4 of the motorcycle 2. The collar or neck-portion 28 and the body portion 29 of the harness 5 are properly adjusted to the respective animal to be carried on the motorcycle 2 and the resilient members 31 are connected to respective opposite ends of the connection member 30 of the harness 5 thereby securing same to the frame 3.

It is to be understood that while I have illustrated and described one form of my invention it is not to be limited to the specific form or arrangement of parts herein described and shown.

I claim:

1. An animal carrying device for motorcycles comprising:
   a. a frame for mounting on a gasoline tank of a motorcycle and having a pair of spaced ends positioned adjacent respective opposite ends of the gasoline tank, said ends each having a center portion and opposite end portions, said frame having a pair of side members extending between respective opposite end portions of said ends and secured thereto;
   b. a protective member mounted on the center portion of each of said pair of ends for engagement with an upper surface of the gasoline tank;
   c. a strap for each end of said frame and having one end movably mounted on the respective end of said frame and a keeper member for each end of said frame mounted on the respective end and adapted to receive the other end of the strap to secure same in the keeper member, said straps each extend around a portion of the gasoline tank substantially aligned with the portion in engagement with the respective protective member to thereby removably secure said frame to the gasoline tank; and
   d. an animal securing means and means for connecting same to said frame in a position above the gasoline tank of the motorcycle, said means for connecting said animal securing means to said frame comprises a plurality of resilient members extending between and having respective opposite ends connected to said animal securing means and to said frame.

2. An animal carrying device as set forth in claim 1 wherein:
   a. said side members of said frame each have a first portion and a second portion movable therealong whereby the spacing between said ends of said frame is adjustable; and
   b. said first portion and said second portion of each of said side members have means engageable therewith for maintaining a selected spacing between said end members of said frame.

3. A carrying device for motorcycles comprising:
   a. a frame for mounting on a gasoline tank of a motorcycle and having spaced ends positioned adjacent respective opposite ends of the gasoline tank, said frame including adjustable side members extending between and secured to respective opposite end portions of said ends to vary the spacing between said ends and having means for maintaining the adjusted length of said side members;
   b. a protective member mounted on each of said ends for engagement with an upper surface of the gasoline tank;
   c. means engaging said ends for removably securing same to the gasoline tank, said means for removably securing said ends to the gasoline tank including a strap for each end and having one end movably mounted on the respective end and a keeper member adapted to receive the other end of the strap to secure same in the keeper member, the straps each engaging opposite side surfaces and a lower surface opposite the respective upper surface in engagement with the respective end of said frame; and
   d. object securing means and means for connecting same to said frame in a position above the gasoline tank of the motorcycle, said means for connecting said object securing means to said frame comprising a plurality of resilient members extending between and having respective opposite ends connected to said object securing means and said ends of said frame.

4. A carrying device for motorcycles comprising:
   a. a frame for mounting on a gasoline tank of a motorcycle and having spaced ends positioned adjacent respective opposite ends of the gasoline tank, said ends of said frame each having a center portion and opposed end portions, said frame including a pair of side members extending between respective end portions of said ends and being secured thereto, said side members each being adjustable in length to vary the spacing between said ends and having means for maintaining the adjusted length of said side members;

b. a protective member mounted on the center portion of each of said ends;

c. means engaging said ends for removably securing same to the gasoline tank, said means for removably securing said ends to the gasoline tank including a strap for each end and having one end movably mounted on the respective end member and a keeper member mounted on said respective end and adapted to receive the other end of the strap to secure same in the keeper member, the straps each engage opposite side surfaces and a lower surface of the gasoline tank opposite the respective upper surface in engagement with the respective protective member; and d. object securing means and means for connecting same to said frame in a position above the gasoline tank of the motorcycle, said means for connecting said object securing means to said frame comprising a plurality of resilient members extending between and having respective opposite ends thereof connected to said object securing means and to said frame adjacent the ends thereof.

* * * * *